United States Patent
Karlin et al.

(10) Patent No.: US 8,595,818 B2
(45) Date of Patent: Nov. 26, 2013

(54) SYSTEMS AND METHODS FOR DECOY ROUTING AND COVERT CHANNEL BONDING

(75) Inventors: Josh Forrest Karlin, Cambridge, MA (US); Gregory Stephen Lauer, Sudbury, MA (US); Craig Partridge, East Lansing, MI (US); David Patrick Mankins, Cambridge, MA (US); William Timothy Strayer, West Newton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 196 days.

(21) Appl. No.: 13/150,724

(22) Filed: Jun. 1, 2011

(65) Prior Publication Data

US 2012/0311691 A1  Dec. 6, 2012

(51) Int. Cl.
*H04L 29/06*  (2006.01)
*G06F 11/00*  (2006.01)
*G06F 12/14*  (2006.01)
*G06F 12/16*  (2006.01)
*G08B 23/00*  (2006.01)

(52) U.S. Cl.
USPC .................. 726/12; 726/22; 726/23; 726/24; 713/150

(58) Field of Classification Search
None
See application file for complete search history.

(56) References Cited

U.S. PATENT DOCUMENTS

| | | | |
|---|---|---|---|
| 7,331,060 B1 * | 2/2008 | Ricciulli | 726/22 |
| 7,447,796 B2 * | 11/2008 | Forrester | 709/238 |
| 2005/0204157 A1 * | 9/2005 | Johnson | 713/200 |
| 2008/0018927 A1 * | 1/2008 | Martin et al. | 358/1.15 |
| 2010/0024034 A1 * | 1/2010 | Cohen | 726/24 |
| 2011/0055549 A1 * | 3/2011 | Ei Khayat et al. | 713/150 |
| 2011/0179487 A1 * | 7/2011 | Lee | 726/23 |
| 2011/0276597 A1 * | 11/2011 | Little | 707/770 |

OTHER PUBLICATIONS

Clarke, Ian, "A Distributed Decentralised Information Storage and Retrieval System," Master's Thesis, University of Edinburgh, 1999.
Butler, Kevin et al, "A Survey of BGP Security Issues and Solutions," Proceedings of the IEEE, 98:1, Jan. 2010, pp. 100-122.
Jackson, Alden W., et al., "A Topological Analysis of Monitor Placement," Sixth IEEE International Symposium on Network Computing and Applications (NCA 2007) 8 pages.
"Ahmadinejad: Anyone who strikes Iran will regret it," Haaretz.com, retrieved from http://www.haaretz.com/misc/article-print-page/ahmadinejad-anyone-who-strikes-iran-will . . . on Sep. 13, 2011.

(Continued)

*Primary Examiner* — Shin-Hon Chen
(74) *Attorney, Agent, or Firm* — Ropes & Gray LLP

(57) ABSTRACT

Systems, methods, and devices for decoy routing and covert channel bonding are described. The decoy routing system includes a client computing device, a decoy router, and a decoy proxy such that packets addressed to a decoy destination are re-routed by the decoy router to a covert destination via the decoy proxy. The decoy routing method may be applied to a covert channel bonding process, in which a plurality of packet data streams are sent to one or more decoy destinations, re-routed appropriately via one or more decoy routers and/or decoy proxies, and assembled together into a single packet data stream at either a decoy proxy, or a final covert destination.

29 Claims, 9 Drawing Sheets

(56) References Cited

OTHER PUBLICATIONS

Holme, Petter, et al., "An Integrated Model of Traffic, Geography and Economy in the Internet," ACM SIGCOMM Computer Communication Review, 38:3, Jul. 2008, pp. 7-15.
"Announcing the Advanced Encryption Standard (AES)," Federal Information Processing Standards Publication 197, Nov. 26, 2001 issued by the National Institute of Standards and Technology (NIST).
Karlin, Josh, et al., "Autonomous Security for autonomous Systems," Computer Networks, 52 (2008) pp. 2908-2923.
"Freegate: Gateway to free Internet," Dynamic Internet Technology, Inc., http://dit-inc.us/freegate, retrieved from the internet on Feb. 17, 2012, 1 page.
"Global Pass" retrieved from http://www.gpass1.com/gpass/ on Oct. 6, 2011.
"Guardster," retrieved from http://www.guardster.com on Sep. 13, 2011.
"Measuring Tor and Iran : New Tor Clients from Iranian IP Space," Blog Post at https://blog.torproject.org/blog/measuring-tor-and-iran, retrieved from the internet on Sep. 13, 2011, 11 pages.
"OpenNet Initiative : Country Profiles,"http://opennet.net/research/profiles, retrieved from the internet on Sep. 13, 2011, 2 pages.
Goldberg, Sharon, et al., "Path-Quality Monitoring in the Presence of Adversaries," Sigmetrics'08, Jun. 2-6, 2008, 2008 ACM.
"Proxify: proxify anonymous proxy protectes your online privacy," Proxify, http://proxify.com, retrieved from the internet on Oct. 6, 2011, 1 page.
Holme, Petter, et al., "Radial Structure of the Internet," Proc. R. Soc. A, vol. 463, Jan. 12, 2007, pp. 1-16.
"Stupid censorship Web Proxy," http://www.stupidcensorship.com/, retrieved from the internet on Sep. 13, 2011, 1 page.
"Tor Partially Blocked in China," The Tor Blog, Blog Post at https://blog.torproject.org/blog/tor-partially-blocked-china, retrieved from the internet on Sep. 13, 2011, 12 pages.
"Ultrasurf—Free Proxy-Based Internet Privacy and Security Tools," http://www.ultrareach.com/, retrieved from the internet on Sep. 13, 2011.
Baliga, A., et al., "A Web Based Covert File System," Proceedings of the 11th USENIX Workshop on Hot Topics in Operating Systems HOTOS 2007.
Burnett, S., et al., "Chipping Away at Censorhip Firewalls with User-Generated Content," USENIX Security Symposium, 2010.
Chun, B., et al., "Planetlab: An Overlay Testbed for Broad-Coverage Services," in SIGCOMM, 2003.
Dingledine, R., et al., "Tor: The Second Generation Onion Router," 13th USENIX Security Symposium 2004.
Feamster, N., et al., "Infranet: Circumventing Web Censorship and Surveillance," Proceedings of the 11th USENIX Security Symposium, Aug. 2002.
Feldman, A., et al., "Deriving Traffic Demands for Operational IP Networks: Methodology and Experience," IEEE/ACM Transactions on Networking, pp. 265-279, Jun. 2001.
Freedman, M.J., et al., "Democratizing content publication with Coral," Network Systems Design and Implementation, 2004.
Goldberg, S., et al., "Security Vulnerabilities and Solutions for Packet Sampling," invited paper, Proce. IEEE Sarnoff Symposium, Apr.-May 2007.
Grossglauser, M., et al., "Passive Traffic Measurement for IP Operations," Oxford University Press, 2005.
Karlin, J., et al., "Nation-State Routing: Censorship, Wiretapping, and BGP," Tech. Rep. ArXiv:0903.3218, University of New Mexico, Computer Science Department, 2009.
Karlin, J., et al., "Pretty Good BGP: Improving BGP by Cautiously Adopting Routes," in ICNP '06:2006 IEE International Conference on Network Protocols, 2006.
Subramanian, L., et al., "Characterizing the internet hierachy from multiple vantage points," Proc. IEE INFOCOM, Jun. 2002.
Watson, D., et al, "Protocol scrubbing: network security through transparent flow modification," IEEE/ACM Trans. Netw., vol. 12, No. 2, pp. 261-273, 2004.
White, B., et al., "An integrated experiemental environment for distributed systems and networks," (Boston, MA), pp. 255-270, Dec. 2002.
Wu, J., et al, "Finding a needle in a haystack: Pinpoint Insignificant BGP routing changes in an IP network," Proc. Networked Systems Design and Implementation, May 2005.
Murdoch et al., "Embedding Covert Channels into TCP/IP", Proceedings of the 7th International Conference on Information Hiding, pp. 247-261, (2005).

* cited by examiner

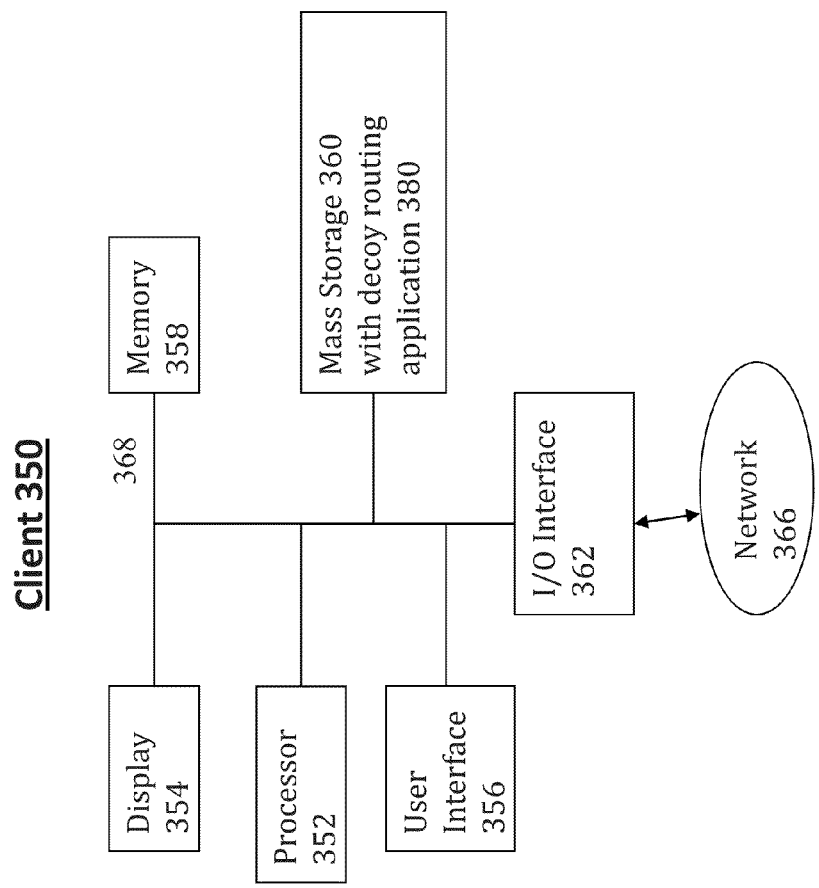

SYSTEMS AND METHODS FOR DECOY ROUTING AND COVERT CHANNEL BONDING

GOVERNMENT CONTRACT

The U.S. Government has a paid-up license in this invention and the right in limited circumstances to require the patent owner to license others on reasonable terms as provided for by the terms of Contract No. N66001-11-C-4017 awarded by DARPA.

FIELD OF THE INVENTION

This invention relates generally to systems for routing packets through the Internet, and more particularly to systems and methods for securely routing packets from a client computing device in a restricted network to a covert destination in an unrestricted network.

BACKGROUND

The Internet has become the preferred mode of communication for people across the world. Many of these people routinely use electronic mail (e-mail), video chatting services such as those offered by Google or Skype, web or microblogs such as Twitter, various social media services such as Facebook, and file transfer systems in the course of their day. To communicate information over the Internet, the information is generally encoded into pieces of data—referred to as IP packets—and transmitted from one location on the Internet to another. There are several types of protocols that may be transmitted in IP packets. Examples include HTTP packets, voice-over-IP (VoIP) packets, SMTP packets, secure socket layer (SSL) packets and transport layer security (TLS) packets, each having its own particular format and associated communication protocol. It is generally the case that each location on the Internet is typically associated with a unique Internet Protocol (IP) address. By including at least this IP address in a destination IP address field within a packet, a router that encounters the packet before it has reached its destination may attempt to forward that packet onward to its destination location as specified by this destination IP address. The IP address of the source of the communication is provided in a source IP address field in the packet.

Communication networks generally include one or more gateways. Gateways are entrance points into and/or exit points from a communication network. Some networks have multiple gateways positioned at various strategic locations in the network. For example, a network may have a separate gateway at each boundary with a different network. In other words, for a packet to travel from one network to another, the packet typically must traverse through a gateway on the source network and through a second gateway on the destination network. Thus, gateways serve as funnels through which crossnetwork communications can be monitored, and potentially filtered/blocked.

Many entities, including system administrators on private networks may block, filter, redirect, intercept, or even modify traffic between clients on their networks and popular or controversial websites or other Internet-based services. Such entities are referred to herein as adversaries. Thus, an adversary is a network service provider that wishes to deny access from clients on its network to a given set of hosts or services in the Internet. A listing of this set of hosts or services is referred to as a "blacklist," and the set of hosts and services is "blacklisted" as far as the adversary is concerned. A network with an adversary is referred to as a "restricted network," while one without an adversary is generally referred to as an "unrestricted network." Most often, adversaries are able to blacklist a set of destinations by leveraging the fact that the unique destination IP address to which a packet is to be delivered is visible (i.e., not hidden and/or encrypted) within the IP packet so that mid-stream routers are able to recognizes this IP address and route the packet appropriately. Because the destination IP address of a packet is visible, it is generally easy for an adversary to filter IP packets destined for a particular destination IP address that is blacklisted. Because communications from a restricted network to such sites would have to travel through a path including the adversary, it is relatively trivial for the adversary to filter data packets if the destination IP address in the packets indicated the packets were intended for these blacklisted hosts or sites based on the websites' IP addresses, and subsequently discard the filtered packets. This is referred to as IP filtering, and is routinely performed by adversaries across the Internet.

In other cases, such IP filtering is used to monitor communications without actually blocking them. For example, an entity on the Internet may monitor which IP addresses attempt to access various websites. This monitoring may be carried out to discover those who attempt to access restricted content, or merely to collect data to mine for commercial gain, for example to guide targeted marketing campaigns. Often times, it is desirable to be able to avoid such monitoring. That is, it may be desirable for an entity on a network that has an adversary that monitors or blocks IP packets to be able to transmit packets to a destination that would normally be blocked by the adversary or network monitor. It also would be desirable for entities to communicate with another entity without an adversary or network monitor being able to trace the communication back to its source. As used herein the term "covert destination" refers to a destination IP address which the source of the communication wishes to hide from an adversary or monitor. A covert destination need not be a secret Internet location, and transmitting packets of data to covert destination is not necessarily a part of a clandestine operation, other than with respect to the adversary or monitor or other entity tracking network traffic or communication flows on the Internet. Instead such destinations are referred to as covert destinations because a technique attempting to circumvent an adversary or monitor would generally require keeping the destination IP address hidden from the adversary Existing techniques for avoiding IP filtering, including circumvention proxies and tunnels have many shortcomings. Essentially, each of these IP filtering circumvention tools make a packet appear as if it were intended for a destination IP address that is not blocked. Nevertheless, the intended destination IP address is visible within the IP packet. These routers, referred to as proxy servers, upon receipt of a packet, generate new packets using their own IP addresses as the source IP address and the actual covert destination IP address as the destination address. The proxy servers, upon receiving return communications, which have the covert destination IP address as the source IP address and proxy server's IP address as the destination address, forward the packets back to original source, replacing the source IP address with its own and the destination IP address with the original source's IP address. However, for many of these tools, a list of proxy server IP addresses is published or otherwise readily available, making it easy for an adversary to obtain and subsequently block the list of destination IP addresses. Furthermore, often times these IP addresses do not correspond to existing domain names on the Internet (e.g., google.com), making it even easier for an adversary to detect, enumerate and block these IP addresses. Tunneling tools attempt to create a secure communication channel (e.g., using encryption techniques) between two entities on the Internet over which encrypted packets of data can be sent, but are also associated with a visible list of IP addresses for a handful of servers to which the encrypted packets of data are sent. Examples include TLS, SSL, VPNs, and data over web requests (e.g., HTTPS).

SUMMARY OF THE INVENTION

Therefore, there exists a need for systems and methods that allow for circumvention of tools such as IP filtering and provide individuals increased privacy in their communications that avoid the shortcomings of existing tools described above. There also exists a need for systems and methods that allow for undetected communication of data packet streams over secure communication channels. For the remainder of this application, the systems and methods will be described primarily with respect to circumvention of IP filtering. However, it should be understood that they also may be used to provide increased privacy by circumventing various Internet traffic monitoring schemes.

The systems and methods described herein include improved systems and methods for decoy routing. Such decoy routing may also be used in systems and methods for covert channel bonding. More particularly, the systems and methods described herein provide a low-latency, high-bandwidth communication channel over the Internet between a client computing device on a restricted network and a host in an unrestricted network whose IP address is actively being blocked by an adversary in the restricted network. In some embodiments, the systems and methods described herein allow the client computing device to transmit an IP packet with a decoy destination IP address. Along the packet's path of transmission, it is re-routed via a decoy router and/or a decoy proxy to an alternate, intended covert destination IP address, as discussed further below. A "decoy proxy" is a router which is configured (e.g., via programming) to transmit received packets between a client computing device and a covert destination such that communications between the client computing device and covert destination appear to be between the client computing device and a decoy destination. Decoy routing in this manner effectively circumvents any IP filtering, since the only IP addresses accessible to the IP filter in the packet are addresses of allowable sources and allowable destinations. In other words, to an adversary, such network traffic activity appears ordinary and permissible. The decoy routing systems and methods may be employed in covert channel bonding, in which the client computing device sends a plurality of packets associated with a single communication or data file over a plurality of disparate communication channels (e.g. data over VoIP, data over HTTPS, TLS, etc.) to a plurality of decoy destinations using decoy routers, which redirect the packets to a decoy proxy which reassembles the packets into a single TCP packet stream to the single intended destination. Alternatively, the packets can be reassembled at the destination itself. To an adversary, such activity would also appear ordinary.

In one aspect, the invention relates to a method for transmitting data from a client computing device in a restricted network to a covert destination using decoy routing. The method comprises receiving, by a decoy router, a packet of data addressed to a decoy destination but intended for a covert destination. The method includes determining, by the decoy router, based at least in part on a message within the packet, that the packet is intended for a covert destination. The message may include a particular number appearing in the packet, or a sequence of values or numbers appearing in the packet, or even a permutation of values or numbers appearing in the packet. The method includes directing, by the decoy router, the packet to a decoy proxy. The method includes establishing, by the decoy proxy, a communication channel with the client computing device over which communications between the decoy proxy and the client computing device appear to other devices on the network to be communications between the client computing device and the decoy destination. The method includes receiving, by the decoy proxy, a second packet of data from the client computing device addressed to the decoy destination. The method includes forwarding, by the decoy proxy, the second packet to the covert destination.

In some embodiments, the packet is an Internet Protocol (IP) packet. In some embodiments, the packet is transmitted via one of a voice-over-internet protocol (VoIP), Transport Layer Socket (TLS), Secure Socket Layer (SSL), secure hypertext transfer protocol (HTTPS), and transport communication protocol over domain name server (TCP-over-DNS) channel. In some embodiments, establishing communications includes establishing a Transport Layer Security (TLS) channel between the client computing device and the decoy destination. In some embodiments, establishing communications includes transmitting a sentinel between the decoy proxy and the client computing device. In some embodiments, establishing communications further includes providing an encryption key for the communications between the client computing device and the decoy proxy, and encrypting at least a portion of the first, second or any subsequent packet of data using the encryption key. In some embodiments, the communication channel between the decoy proxy and the client computing device circumvents IP filtering carried out by an intervening network device. In some embodiments, the method further includes modifying, by the decoy proxy, the packet, wherein modifying includes replacing a destination IP address of a packet with a new destination IP address.

In another aspect, the invention relates to a method for transmitting data via covert channel bonding. The method includes receiving, by a plurality of decoy routers, at least two packets from a client computing device. Each of the at least two packets is addressed to a respective decoy destination but intended for a covert destination and the two packets are part of a stream of packets, and the at least two packets are transmitted over a first and a second communications channel. The method further includes determining, by the decoy routers, based at least in part on a message within each of the at least two packets, if the packets are intended for the covert destination. The message may include a particular number appearing in the packet, or a sequence of values or numbers appearing in the packet, or even a permutation of values or numbers appearing in the packet. The method further includes forwarding, by the decoy routers, the packets to a decoy proxy.

In some embodiments, the method further includes establishing, by the decoy proxy, a first communications channel between the client computing device and the decoy proxy over which communications between the decoy proxy and the client computing device appear to other devices on the network to be communications between the client computing device and the decoy destination. In some embodiments, the method further includes receiving, by the decoy proxy, a second packet of data from the client computing device addressed to the decoy destination. In some embodiments, the method further includes forwarding, by the decoy proxy, the second packet to the covert destination. In some embodiments, the method further comprises receiving, at the decoy proxy, the packets over the first and second communication channels, and assembling, at the decoy proxy, the packets to obtain the stream of packets.

In some embodiments, the method further includes receiving, at the covert destination, the two packets over the first and the second communications channel, and assembling, at the covert destination, the at least two packets to obtain the stream of packets.

In some embodiments, the first and second network communication channels are selected from a group comprising at least secure socket layer (SSL), transport layer security (TLS), secure hypertext transfer protocol (HTTPS), and voice-over-internet protocol (VoIP). In some embodiments, establishing communications includes sending a sentinel between the client computing device and a respective decoy proxy.

In some embodiments, the method further includes modifying, by the decoy router, the at least two packets, wherein modifying includes replacing a respective destination IP address of a respective packet with a respective new destination IP address.

In yet another aspect, the invention relates to a system for transmitting data from a client computing device to a covert destination. The system comprises a decoy router for receiving a packet of data addressed to a decoy destination but intended for a covert destination, and determining, based at least in part on a within the packet, that the packet is intended for the covert destination instead of the decoy destination; and forwarding the packet to a decoy proxy. The system also includes a decoy proxy for receiving the packet of data, establishing a communication channel with a client computing device that transmitted the packet over which communications appear to other devices on the network to be communications between the client computing device and the decoy destination instead of the client computing device and the covert destination, receiving one or more additional packets of data, addressed to the decoy destination but intended for the covert destination, from the client computing device, and forwarding the one or more additional packets to the covert destination. The message may include a particular number appearing in the packet, or a sequence of values or numbers appearing in the packet, or even a permutation of values or numbers appearing in the packet.

In some embodiments, the communications channel is selected from a group comprising at least secure socket layer (SSL), transport layer security (TLS), secure hypertext transfer protocol (HTTPS), and voice-over-internet protocol (VoIP). In some embodiments, the decoy router is coupled to a network gateway for a network including the covert destination.

In yet another aspect, the invention relates to a non-transitory computer readable medium for decoy routing including computer-readable instructions, which when executed by a processor, cause the processor to generate a packet of data addressed to a decoy destination that includes a message indicating the packet of data is intended for a covert destination, and transmit the packet from a client computing device to the decoy destination. In some embodiments, the message may include a particular number appearing in the packet, or a sequence of values or numbers appearing in the packet, or even a permutation of values or numbers appearing in the packet. In some embodiments, the medium further includes computer-readable instructions, which when executed by a processor, cause the processor to establish a communication channel with a decoy proxy over which communications appear to other devices on the network to be communications between the client computing device and the decoy destination instead of the client computing device and the covert destination. In some embodiments, the communications channel is a secure communications channel. In some embodiments, the secure communications channel is selected from a group comprising at least secure socket layer (SSL), transport layer security (TLS), secure hypertext transfer protocol (HTTPS), and voice-over-internet protocol (VoIP).

In yet another aspect, the invention relates to a non-transitory computer readable medium for decoy routing including computer-readable instructions, which when executed by a processor, cause the processor to receive a packet of data addressed to a decoy destination but intended for a covert destination, establish a communication channel with a client computing device that transmitted the packet over which communications appear to other devices on the network to be communications between the client computing device and the decoy destination instead of the client computing device and the covert destination, receive one or more additional packets of data, addressed to the decoy destination but intended for the covert destination, from the client computing device, and forward the one or more additional packets to the covert destination. In some embodiments, the communications channel is a secure communications channel. In some embodiments, the secure communications channel is selected from a group comprising at least secure socket layer (SSL), transport layer security (TLS), secure hypertext transfer protocol (HTTPS), and voice-over-internet protocol (VoIP).

In yet another aspect, the invention relates to a non-transitory computer readable medium for decoy routing including computer-readable instructions, which when executed by a processor, cause the processor to receive a packet of data addressed to a decoy destination but intended for a covert destination, determine, based at least in part on a message within the packet, that the packet is intended for the covert destination instead of the decoy destination, and forward the packet to a decoy proxy. In some embodiments, the communications channel is a secure communications channel. In some embodiments, the secure communications channel is selected from a group comprising at least secure socket layer (SSL), transport layer security (TLS), secure hypertext transfer protocol (HTTPS), and voice-over-internet protocol (VoIP). The message may include a particular number appearing in the packet, or a sequence of values or numbers appearing in the packet, or even a permutation of values or numbers appearing in the packet.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and as not limiting in any way:

FIG. 3B is a schematic depicting the physical components of a client computing device that may be employed within any of the client computing devices depicted in FIGS. 1 and 2, according to an illustrative embodiment of the invention;

DETAILED DESCRIPTION OF THE ILLUSTRATED EMBODIMENTS

To provide an overall understanding of the invention, certain illustrative embodiments will now be described, including systems, devices, methods and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

As will be seen from the following description, in one aspect, the systems and methods described herein relate to a decoy routing system having a client computing device, a decoy router, and a decoy proxy. This system is described in more detail with respect to FIGS. 2-6, particularly with respect to FIG. 2. In another aspect, the systems and methods described herein relate to a covert channel bonding system having a client computing device, a decoy router, and a plurality of decoy proxies. This system is also described in more detail with respect to FIGS. 2-6.

Figure 1:
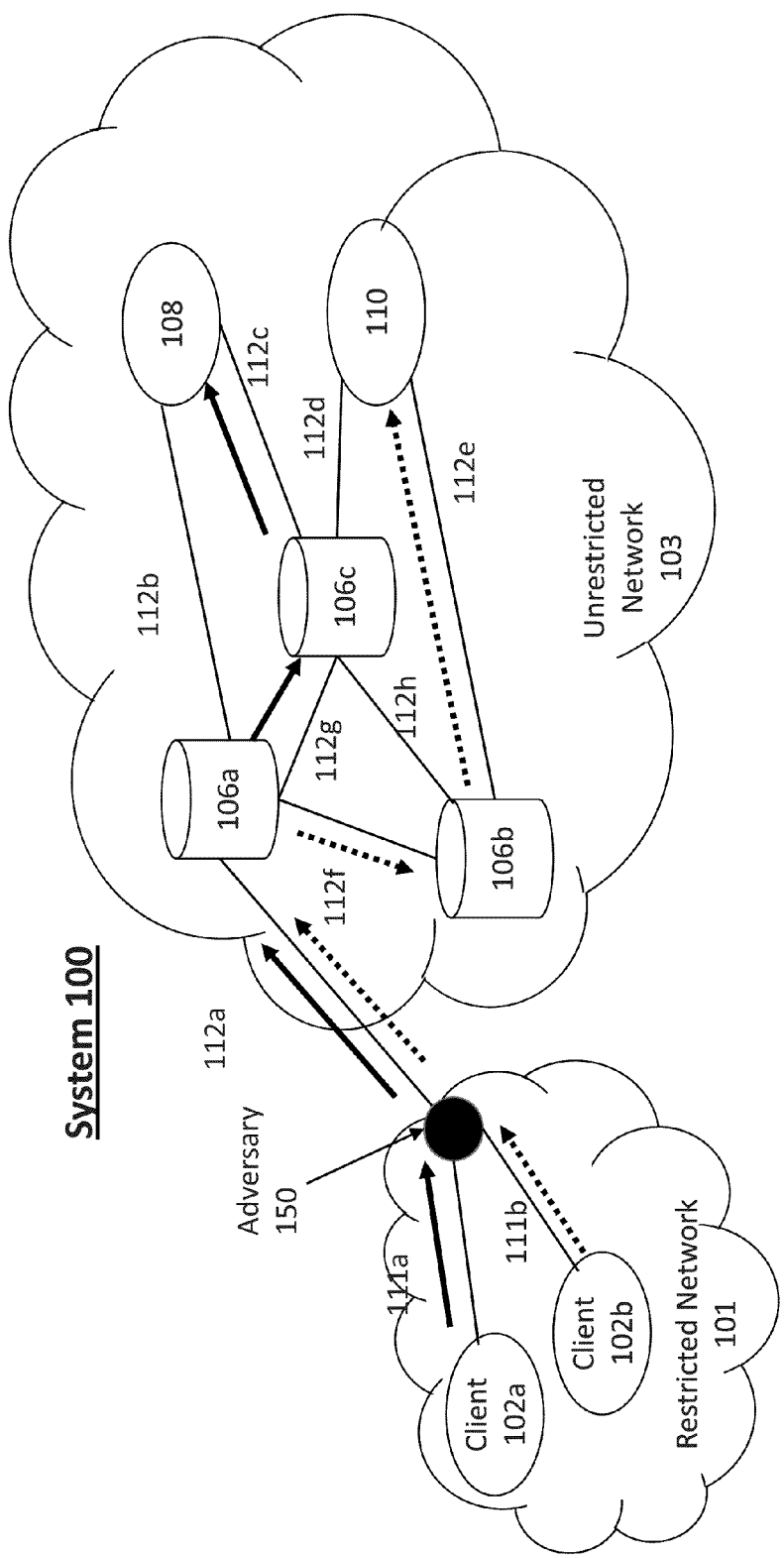
FIG. 1 is a block diagram depicting a system for routing packets from a restricted network to an unrestricted network, according to an illustrative embodiment of the invention.

FIG. 1 is a block diagram depicting a system 100 for routing packets from a restricted network 101 to an unrestricted network 103, according to an illustrative embodiment of the invention. Restricted network 101 and unrestricted network 103 may be two different parts of a local network, two entirely different networks, or two different networks coupled to the Internet.

A network includes one or more components such as gateways, routers, proxies, personal computers, servers, etc. Illustratively, restricted network 101 includes client computing device 102a and client computing device 102b. Each of client computing devices 102a and 102b, for example, is coupled to an adversary 150 of the restricted network 101 via links 111a and 111b, respectively. Adversary 150 may be at or near a gateway out of restricted network 101, or at some other central network location through which network traffic in restricted network 101 is concentrated. Adversary 150 is in turn coupled to router 106a via link 112a. Router 106a may serve as a gateway to unrestricted network 103. Router 106a is coupled to devices 106b and 106c via links 112g and 112f, respectively. Devices 106a and 106b may be proxies, servers, or routers. Devices 106a and 106c are also coupled to a destination 108 in the restricted network 103 via links 112b and 112c, respectively. Devices 106c and 106b are also coupled to a destination 110 in the restricted network 103 via links 112d and 112e, respectively. For the purposes of this explanation, it will be assumed that the adversary 150 blocks communications between devices on the restricted network 101, such as client computing devices 102a and 102b, and destination 110, which will be hereafter referred to as covert destination 110. Adversary 150 is assumed to be a network gateway or coupled to a network gateway of restricted network 101. In alternative embodiments, adversary 150 may be assumed to be a network gateway or coupled to a gateway of unrestricted network 103.

Client computing devices 102a and 102b are computing devices within restricted network 101, and will be described further with respect to FIG. 3B. Each of client computing devices 102a and 102b includes a processor that can execute computer-readable instructions, which may be stored in a memory of the computing device, for performing various steps of one or more routing or networking processes. For example, each of client computing devices 102a and 102b may generate and transmit packets of data to other components within restricted network 101 or to components within other networks such as unrestricted network 103.

As described above, adversary 150 is a network component that monitors network traffic that is intended to be delivered to or received from a component outside restricted network 101, such as one of destination 108 or covert destination 110, or to other network components in restricted network 101. Adversary 150 can block the delivery of network traffic to certain destinations in the unrestricted network 103. For instance, Adversary 150 monitors the IP address of packets of data passing out of restricted network 101 and discards packets intended for the IP address of covert destination 110, or any other IP address on a list of blocked or "blacklist" of destination IP addresses. Alternatively, it only forwards packets intended for the IP address on a list of allowed or "whitelist" of destination IP addresses. In FIG. 1, the solid arrows show network traffic flow paths from client computing device 102a to destination 108 via adversary 150, router 106a, and router 106c. Adversary 150 would allow packets traversing such a communications or network traffic flow path (or their reverse) because destination 108 is not a blocked/restricted destination. In FIG. 1, the dashed arrows show network traffic flow paths from client computing device 102b to covert destination 110 via adversary 150, router 106a, and router 106b. Adversary 150 would not allow such a network traffic flow path (or its reverse) because destination 110 is a blocked/restricted/covert destination. Upon detecting packets attempting to traverse such a path, the adversary 150 would filter out such packets and not forward them to router 106a, thereby preventing successful communications to or from covert destination 110. Because the only path between client computing devices 102a and 102b and router 106a must include adversary 150, adversary 150 can effectively block all communications intended for a covert destination on unrestricted network 103.

In some aspects, the invention relates to systems and methods that allow a client computing device in a restricted network to transmit information (e.g., packets of data) to and receive information from a covert destination in an unrestricted network thereby circumventing a adversary in the restricted or unrestricted network that is performing IP filtering.

Figure 2:
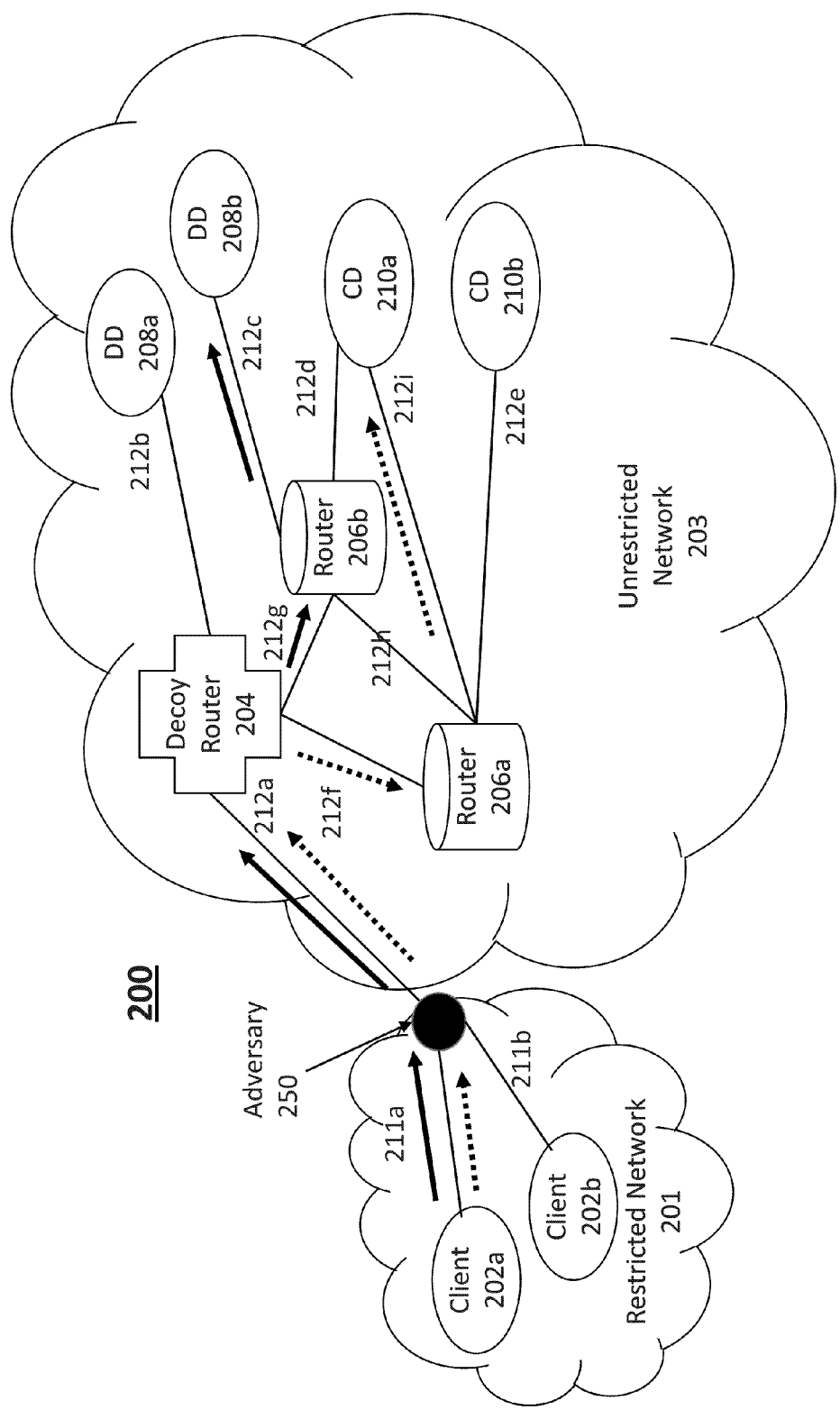
FIG. 2 is a block diagram depicting a decoy routing and/or covert channel bonding system for routing packets to a covert destination, according to an illustrative embodiment of the invention.

FIG. 2 illustrates an exemplary embodiment of a system that is used to circumvent a adversary in a restricted network. More particularly, FIG. 2 is a block diagram depicting a decoy routing and/or covert channel bonding system 200 which may be employed to circumvent an adversary 250 in a restricted network 201, according to an illustrative embodiment of the invention.

As with the networks illustrated in FIG. 1, restricted network 201 and unrestricted network 203 may be two different parts of a local network, two entirely different networks, or two different networks coupled to the Internet. As described above, each of these networks may include a variety of components such as servers, client computing devices, proxies, or routers. Illustratively, restricted network 201 includes client computing device 202a and client computing device 202b. Each of client computing devices 202a and 202b is coupled to adversary 250 of the restricted network 201 via links 211a and 211b, respectively. Adversary 250 may be at or near a network gateway through which traffic exiting restricted network 201 must pass to reach unrestricted network 203. Adversary 250 monitors network traffic or communications entering and/or leaving restricted network 201. Adversary 250 is in turn coupled to a decoy router 204 via link 212a. A decoy router may also be referred to as a decoy router. Decoy router 204 is in turn coupled to a decoy destination 208a, a router 206b, and a router 206a, via links 212b, 212g and 212h, respectively. Decoy router 204 may be at or near a network gateway through which traffic entering unrestricted network 203 from restricted network 201 must pass and/or through which traffic entering restricted network 201 must pass.

The decoy destination 208a need not know that it serves as a decoy. In fact, decoy destination may not even know of the existence of the decoy routing system on the network. Instead, decoy destination is preferably an ordinary non-controversial site or service on the Internet that is unlikely to have others access to it restricted by an adversary. Preferably, the decoy destination is selected by system 200 to be a destination that routinely participates in encrypted communications over a TLS channel, or any other suitable channel, e.g., VoIP, TCP-over-DNS, and HTTPS.

Router 206a is also coupled to covert destinations 210a and 210b via links 212i and 212e, respectively. Covert destinations 210a and 210b are destinations that are blocked by adversary 250 of restricted network 201. Thus, if a device on the restricted network 201 intends to communicate with such destinations, it must do so covertly with respect to adversary 250. Thus, with reference to such communications or network traffic flows, covert destinations 210a and 210b are referred to as covert destinations. Decoy proxy 206b is also coupled to decoy destination 208b via link 212c. In alternative embodiments, the system 200 may include multiple decoy routers 204 each stationed near each of a set of decoy destinations such that all or at least a substantial portion of network traffic directed to such decoy destinations either passes through or can be monitored by a corresponding decoy router 204.

Client computing devices 202a and 202b are computing devices within restricted network 201, and will be described further with respect to FIG. 3B. Each of client computing devices 202a and 202b includes a processor that can execute computer-readable instructions, which may be stored in a memory of the computing device, for performing various steps of one or more routing or networking processes. For example, each of client computing devices 202a and 202b generates and transmits packets of data to other components within restricted network 201 or to components within other networks such as unrestricted network 203.

Adversary 250 is a network component that monitors network traffic intended to be delivered to or received from a component outside restricted network 201, such as destinations 208a or 210a, or, in some cases, to other network components within restricted network 201. Adversary 250 can block the delivery of such traffic. In addition, or in the alternative, adversary 250 may maintain a log of such communications for use against the sources of the communication on the restricted network 201. For instance, adversary 250 monitors the IP address of packets of data passing out of restricted network 201 and discards packets that include the IP address of destinations 210a and 210b. In FIG. 2, the solid arrows show network traffic flow paths from client computing device 202a to destination 208b via adversary 250, decoy router 204, and router 206b. Adversary 250 would allow such a network traffic flow path because destination 208b is not a blocked/restricted destination, e.g., based on the IP address of destination 208b. In FIG. 2, the dashed arrows show network traffic flow paths from client computing device 202b to covert destination 210a via adversary 250, decoy router 204, and router 206a. Adversary 250 would not allow such a network traffic flow path because covert destination 210b is a blocked/restricted/covert destination, e.g., based on the IP address of destination 210b.

As described above, a decoy router is a device which may be included within or coupled to any router or gateway of a network. Thus, decoy router 204 is able to observe most, if not all, of the network traffic passing into or out of the unrestricted network 203. In the embodiments of the decoy routing process described below with respect to FIGS. 4-6, a decoy router observes packets of data and forwards packets of data to a ordinary routers or decoy proxies in the network depending on whether the packets include a hidden message indicating that they should be rerouted to a covert destination. The message may include a particular number appearing in the packet, or a sequence of values or numbers appearing in the packet, or even a permutation of values or numbers appearing in the packet. In some embodiments, the value may be any suitable string. In some embodiments, decoy router 204 analyzes all packets that it observes to determine if they should be routed to a covert destination. In such embodiments, as discussed further below, much of the functionality of the decoy router as possible is hardwired into an integrated circuit, such as an application specific integrated circuit (ASIC) so as not to introduce undue latency in the network. In addition, in certain embodiments, routers serving as decoy routers may include a plurality of decoy routers operating in parallel to further reduce latency. In other embodiments, decoy router 204 analyzes only packets that are transmitted via a particular communications channel (e.g., one of TLS, TCP-over-DNS, HTTPS, etc.) to determine if there is a hidden message within the packets.

In some embodiments, routers 206a and 206b are configured to act as decoy proxies, and decoy router 204 directs packets of data within a network traffic flow to one or both of decoy proxies 206a and 206b if the packets include a message indicating that instead of delivering the packet to decoy destinations 208a or 208b, the packets should instead be delivered to a covert destination, e.g., 210a or 210b. Otherwise, decoy router 204 routes the packet as usual towards the destination IP address included in the packet. In this manner, system 200 may be employed in a decoy routing and/or covert channel bonding method as described further with respect to FIGS. 4-6.

In some embodiments, each of decoy proxies 206a and 206b may receive packets of data from decoy router 204. Decoy proxy 206a or 206b subsequently attempts to establish and maintain a communications channel between client computing device 202a and one or more covert destinations 210a or 210b in the unrestricted network 203. In doing so, all communications to the client computing device 202a appear to the rest of the components on each of networks 201 and 203 as if they originated from a decoy destination 208, and all communications from the client computing device 202a to the decoy proxy appear as if they are directed to the same decoy destination 208. Communications are established using any suitable secure communications channels such as TLS, TCP-over-DNS, HTTPS, etc. Once a communications channel is established, several network traffic flows are enabled. In some embodiments, all packets transmitted from client computing device 202a to covert destination 210b via decoy router 204 are routed through a single decoy proxy, such as proxy 206a. In other embodiments, packets are transmitted from the decoy router 204 to a plurality of decoy proxies 206a, 206b, and then to covert destination 210a. In some embodiments, packets from a stream of packets are transmitted from client computing device 202a to decoy router 204, and onward to a plurality of decoy proxies 206a, 206b. These decoy proxies 206a, 206b then forward the packets to a single covert destination 210a, where they are reassembled back into the packet stream. In still other embodiments, a stream of data from client computing device 202a is broken down in to data packets associated with multiple modes of communication, e.g., HTTP, VoIP, FTP, etc. Each of these packets is routed by the decoy router 204 to a single decoy proxy 206a or 206b, which reassembles the packets into a single TCP/IP stream before forwarding to the covert destination. These processes are described further with respect to FIGS. 4-6.

Figure 3A:
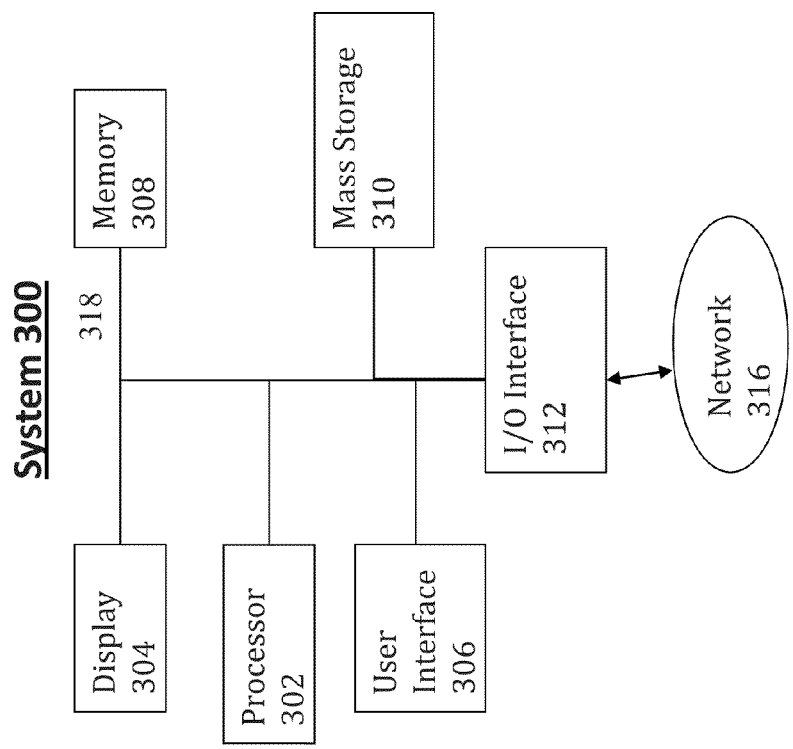
FIG. 3A is a general block diagram depicting the physical components of a computer system that may be employed within any of the components depicted in FIGS. 1 and 2, according to an illustrative embodiment of the invention.

FIG. 3A is a general block diagram depicting the physical components of a computer system 300, which may be employed within any of the network components explicitly depicted in, or discussed with respect to, FIGS. 1 and 2, according to an illustrative embodiment of the invention. For example, those skilled in the art will realize that each of the decoy proxies, client computing devices, decoy router, or covert destinations of FIG. 2 may include some or all of the components described below with respect to FIG. 3A. FIG. 3B is a more detailed description of an exemplary client computer device 350.

With continued reference to FIGS. 1, 2 and 3A, the computer system 300 includes a processor 302, a memory 308, and an interconnect bus 318. The processor 302 may include a single microprocessor or a plurality of microprocessors for configuring system 300 as a multi-processor system. The memory 308 may include a main memory and a read only memory. The system 300 also includes the mass storage device 310 having, for example, various disk drives, tape drives, FLASH drives, etc. The main memory 308 may also include dynamic random access memory (DRAM) and high-speed cache memory. In operation, the main memory 308 stores at least portions of instructions and data for execution by the processor 302. Any set of the aforementioned components may be coupled to a network 316 via an input/output (I/O) interface 312. The data interface 312 may be a modem, a radio, an Ethernet card or any other suitable data communications device. The data interface 312 may provide a relatively high-speed link to a network 316, such as an intranet or the Internet, either directly or through another external interface. The communication link to the network 316 may be, for example, any suitable link such as an optical, wired, or wireless (e.g., via satellite or 802.11 Wi-Fi or cellular network) link. Alternatively, the system 300 may include a mainframe or other type of host computer system capable of web-based communications via the network 316.

Network 316 is a network similar to those discussed with respect to networks 101, 103, 201 and 203 in FIGS. 1 and 2, and may include components such as routers, proxies, servers, or other computer systems. Each of the aforementioned components may communicate via interconnect bus 318.

The mass storage 310 may include one or more magnetic disk or tape drives or optical disk drives, for storing data and instructions for use by the processor 302. At least one component of the mass storage system 310 stores computer-readable instructions used for processing packets generated and/or received by processor 302. The mass storage system 308 may also include one or more drives for various portable media, such as a floppy disk, a compact disc read only memory (CD-ROM), DVD, or an integrated circuit non-volatile memory adapter (i.e. PC-MCIA adapter) to input and output data and code to and from the processor 302.

The system 300 also includes suitable input/output ports or may use the Interconnect Bus 318 for interconnection with a local display 304 and user interface 306 (e.g., keyboard, mouse, touch screen) or the like serving as a local user interface for programming and/or data entry, retrieval, or manipulation purposes. Alternatively, server operations personnel may interact with the system 300 for controlling and/or programming the system from remote terminal devices (not shown in FIG. 3A) via the network 316.

The components contained in the processor 302 are those typically found in general purpose computer systems used as servers, workstations, personal computers, network terminals, and the like. In fact, these components are intended to represent a broad category of such computer components that are well known in the art.

FIG. 3B is a schematic depicting the physical components of a client computing device 350 that may be employed within any of the client computing devices depicted in FIGS. 1, 2 and 3A, according to an illustrative embodiment of the invention. Client computing device 350 may be any personal computing device including a desktop, laptop, or hand held computer. Client computing device may also be a mobile device such a smart phone or tablet computer, or any other computing or electronic device configured for accessing services via a network.

The client computing device 350 includes a processor 352, a memory 358, and an interconnect bus 358. The processor 352 may include a single microprocessor or a plurality of microprocessors for configuring system 300 as a multi-processor system. The memory 358 may include a main memory and a read only memory. The client computing device 350 also includes the mass storage device 360. In operation, the main memory 358 stores at least portions of instructions and data for execution by the processor 352. Any set of the aforementioned components may be coupled to a network 366 via an input/output (I/O) interface 362. The data interface 362 may be a modem, an Ethernet card, a radio, or any other suitable data communications device. The data interface 362 may provide a relatively high-speed link to a network 366, such as an intranet or the Internet, either directly or through another external interface. The communication link to the network 366 may be, for example, any suitable link such as an optical, wired, or wireless (e.g., via satellite or 802.11 Wi-Fi or cellular network) link.

Network 366 is a network similar to those discussed with respect to networks 101, 103, 201, 203 and 316 in FIGS. 1, 2 and 3A, and may include components such as routers, proxies, servers, or other computer systems. Each of the aforementioned components may communicate via interconnect bus 368.

As described above, the mass storage 360 of the client computing device 350 may include one or more magnetic disk or tape drives or optical disk drives, for storing data and instructions for use by the processor 352. At least one component of the mass storage system 360 stores computer-readable instructions, which when executed by processor 352, cause processor 352 to process packets it receives from or intends to transmit to network 366. Such instructions include instructions for generating packets of data, transmitting packets of data to the network 366 via the I/O interface 362, receiving packets from the network 366 via I/O interface 362, encrypting packets of data, and establishing communications with a device such as a router, proxy, or server in the network 366.

In some embodiments, decoy routing application 380 includes proprietary computer-readable instructions that are executed by processor 352 (FIG. 3B) to cause all communications from any application running on the client computing device (e.g., Skype, Google, Jabber, Firefox) to be directed to the proprietary software for processing. For instance, the proprietary software of decoy routing application 380 may include computer-readable instructions for pointing network traffic from an application executing on the client computing device 350 to a SOCKS5 proxy server executing on the client computing device 350 such that network traffic is transmitted from an application on the client computing device to the SOCKS5 proxy server executing on the client computing device 350. For instance, for some client computing devices 350, the SOCKS5 proxy server may execute via a communications port of the client computing device 350, e.g., port 1080. In some embodiments, when a user of the client computing device 350 wants to transmit information to a covert destination, the user would first initialize the proprietary computer-readable instructions of decoy routing application 380 and then open the application.

More specifically, mass storage 360 stores computer-readable instructions which when executed by processor 352 cause processor 352 to open a decoy routing application 380. Once this decoy routing application 380 is open, all network traffic (e.g., to or from other applications executed by the processor) passes through the decoy routing application 380. In some embodiments, the decoy routing application 380 is configured to use a SOCKS5 proxy server that points to a port (e.g., port 1080) on the client computing device 350, and all network traffic passes through this port. In alternative embodiments, a subset of network traffic, or all network traffic from a selected subset of applications passes through this port. In some embodiments, the decoy routing application 380 is pre-configured with a large list of uncensored/decoy destination IP addresses to which messages intended for a covert destination can be sent. In alternative embodiments, the decoy routing application 380 searches across a large list of IP addresses and attempts to find a decoy destination, to which when packets are directed, results in a message from a decoy proxy is sent to the decoy routing application 380 of client computing device 350. For instance, this list of IP addresses may correspond to the list of IP addresses on a whitelist maintained by an adversary on the network 366. When a user of the client computing device 350 desires to contact a covert destination, or merely to communicate with a destination without an adversary or other monitoring service knowing who it is they are in fact communicating with, the decoy routing application generates communications that appear to be directed to the allowed destinations, but covertly includes a message to alert a decoy router, such as decoy router 204 (FIG. 2), that the client computing device 350 actually intends to communicate with a network device at a different IP address. The decoy router can then route the packet accordingly to create a covert communication channel as described above and further below. In certain embodiments, the decoy routing application 380 can divide a communication across several communication channels for later reassembling packets transmitted via each of these communication channels at a proxy server or a covert destination.

The mass storage system 360 may also include one or more drives for various portable media, such as a floppy disk, a compact disc read only memory (CD-ROM), DVD, an integrated circuit non-volatile memory adapter (i.e. PC-MCIA adapter), or a USB or similar port for accepting a so-called thumb drive to input and output data and code to and from the processor 352. The decoy routing application 380 may be loaded into the client computing device in this manner.

The client computing device 350 also includes suitable input/output ports or may use the Interconnect Bus 368 for interconnection with a local display 354 and user interface 356 (e.g., keyboard, mouse, touch screen) or the like serving as a local user interface for programming and/or data entry, retrieval, or manipulation purposes. Alternatively, server operations personnel may interact with client computing device 350 or controlling and/or programming the system from remote terminal devices (not shown in FIG. 3B) via the network 366.

The components contained in the processor 302 are those typically found in general purpose computer systems used as servers, workstations, personal computers, network terminals, and the like. The same or similar components can also be found in many portable electronic and computing devices including, smart phones, personal digital assistants, and tablets. In fact, these components are intended to represent a broad category of such computer components that are well known in the art.

The systems, devices and methods for decoy routing and/or covert channel bonding described herein may be performed in either hardware, software, or any combination thereof, as those terms are currently known in the art. In particular, the methods described herein may be carried out by software, firmware, or microcode operating on a computer or computers of any type. Additionally, software embodying the systems and methods described herein may comprise computer instructions in any form (e.g., source code, object code, interpreted code, etc.) stored in any non-transitory computer-readable medium (e.g., ROM, RAM, magnetic media, punched tape or card, compact disc (CD) in any form, DVD, etc.). Accordingly, the systems and methods described herein are not limited to any particular platform, unless specifically stated otherwise in this disclosure.

In some embodiments, the methods described herein with respect to FIGS. 1, 2, 3A-B, 4, 5A-C and 6 may also be realized as a software component operating on a conventional data processing system such as a UNIX workstation, MAC computer, or Windows PC. In such an embodiment, the process may be implemented as a computer program written in any of several languages well-known to those of ordinary skill in the art, such as (but not limited to) C, C++, FORTRAN, Java or BASIC. The process may also be executed on commonly available clusters of processors, such as Western Scientific Linux clusters, which are able to allow parallel execution of all or some of the steps in the present process. In some embodiments, the methods described herein may be performed on a processor of a suitable portable device, such as a smartphone, personal data assistant (PDA), mobile phone, tablet computer, etc., with a communication link to a network, e.g., via a satellite, a 802.11 Wi-Fi, or a cellular network link.

Figure 4:
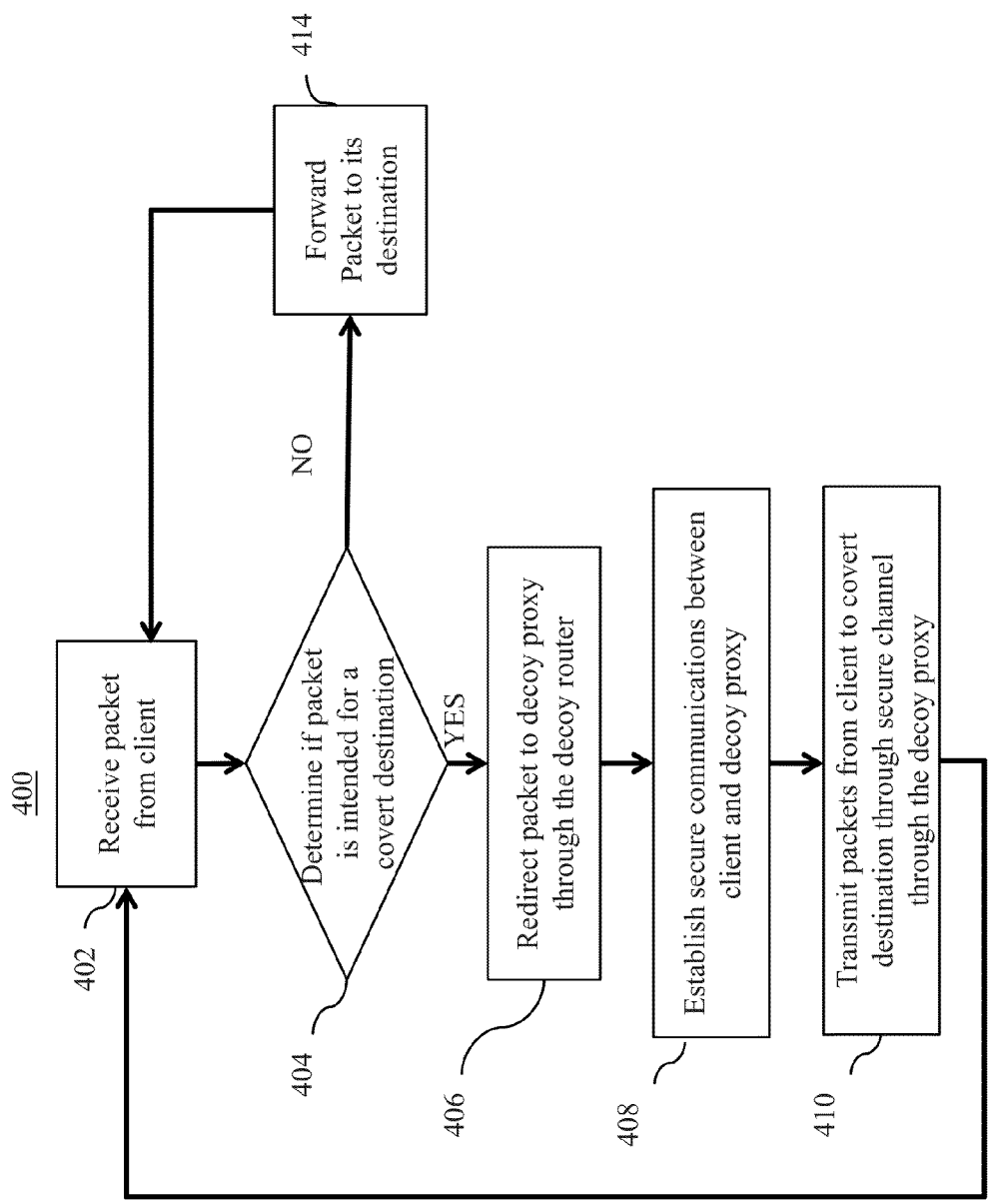
FIG. 4 is a process flow diagram for a decoy routing method, according to an illustrative embodiment of the invention.

FIG. 2 illustrated a system 200 for decoy routing, and with respect to FIGS. 3A and 3B, the components of the system 200 were further described. FIG. 4 illustrates a process 400 for decoy routing that may be implemented using the systems 200, 300 and 350 described above with respect to FIGS. 2, 3A and 3B. In the decoy routing process 400, communications between a client computing device and a covert destination only occur in a manner such that they would be perceived (e.g., by a adversary) as communications occurring between the client computing device and a decoy destination.

In the discussion that follows, it is assumed that the client computing device includes a computing device which in turn includes a processor, e.g., processor 352 of client computing device 350 (FIG. 3B). This processor executes computer-readable instructions which cause the processor to execute a decoy routing application, e.g., application 380 of FIG. 3B. The processor executing this decoy routing application performs the steps of the process 400 of FIG. 4. In the decoy routing process 400, packets of data are transmitted between a client computing device and one or more devices on a network. Each packet is transmitted over any suitable IP communications channel, such as a VoIP, TLS, SSL, HTTPS, or TCP-over-DNS. In the discussion that follows, embodiments will be described in terms of TLS communications. Those skilled in the art will realize that process 400 can be employed with any suitable set of the abovementioned communications channels. TLS is a communications channel between a client computing device and a server, or other network device such as a decoy proxy, which provides for secure communications over a link in a network. TLS generally uses asymmetric keys to authenticate, encrypt or decrypt a message within a TLS record that travels between the client computing device and server. A standard TLS record can be up to several kilobytes in length and includes several fields. One of these fields includes a random number of 28 bytes in length. This field can hold any 28 bytes of information, such as an encrypted message that a decoy router searches for in packets originating from the client computing device 350 (FIG. 3). In some embodiments, the message may include a particular number appearing in the packet, or a sequence of values or numbers appearing in the packet, or even a permutation of values or numbers appearing in the packet. In some embodiments, the value may be any suitable string.

Figure 5A:
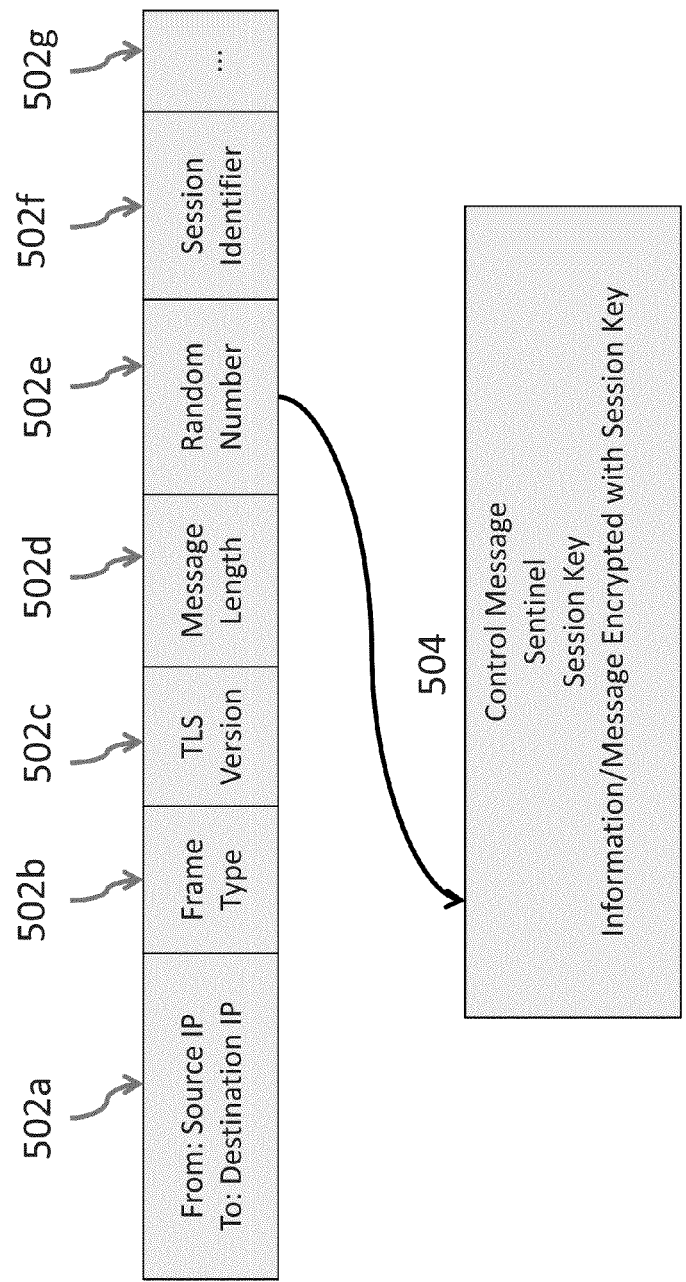
FIG. 5A is a first schematic of a transport layer socket IP packet for use in a decoy routing and/or covert channel bonding system, according to an illustrative embodiment of the invention.

FIG. 5A is a first schematic of a TLS Client Hello record within an IP packet 500 for a TLS handshake protocol used by a decoy routing or covert channel bonding system, such as system 200 in FIG. 2. The illustrative IP packet 500 in FIG. 5A does not include all the fields that would appear in a typical IP packet, nor does it show these fields in the order they may appear in an IP packet. Nevertheless, the illustration in FIG. 5A shows that IP packet 500 includes various fields, typical of fields in standard IP packets used in a TLS handshake protocol that include a TLS ClientHello record after a source and destination IP addresses field 502a: a frame type 502b, a TLS version indicator 502c, a TLS message length 502d, a random number 502e, a session identifier 502f, and other information 502g. TLS ClientHello record may be transmitted as part of a TLS handshake protocol between a client computing device and a decoy proxy. Random number 502e might be an actual random number or it might be an encrypted signal from the client that only a decoy router could decrypt. When used in the decoy routing process 400, the TLS control message indicates, in a fashion that cannot be understood by a network component without the proper decryption key(s), that the packet is to delivered to a destination IP address (e.g., for a covert destination) that is different from that indicated in the field 502a—for the decoy destination. This message may not include the covert destination's IP address; it need only include an indication that the packet is not to be forwarded to the decoy destination. In some embodiments, the TLS record includes a message, referred to as a "sentinel," that includes a random number. In some embodiments, the random number may include an encrypted 64 bit (8 byte) string. In certain embodiments, this random number is encrypted and can only be decrypted by a decoy router or decoy proxy executing a suitable decoy routing application.

Figure 5B:
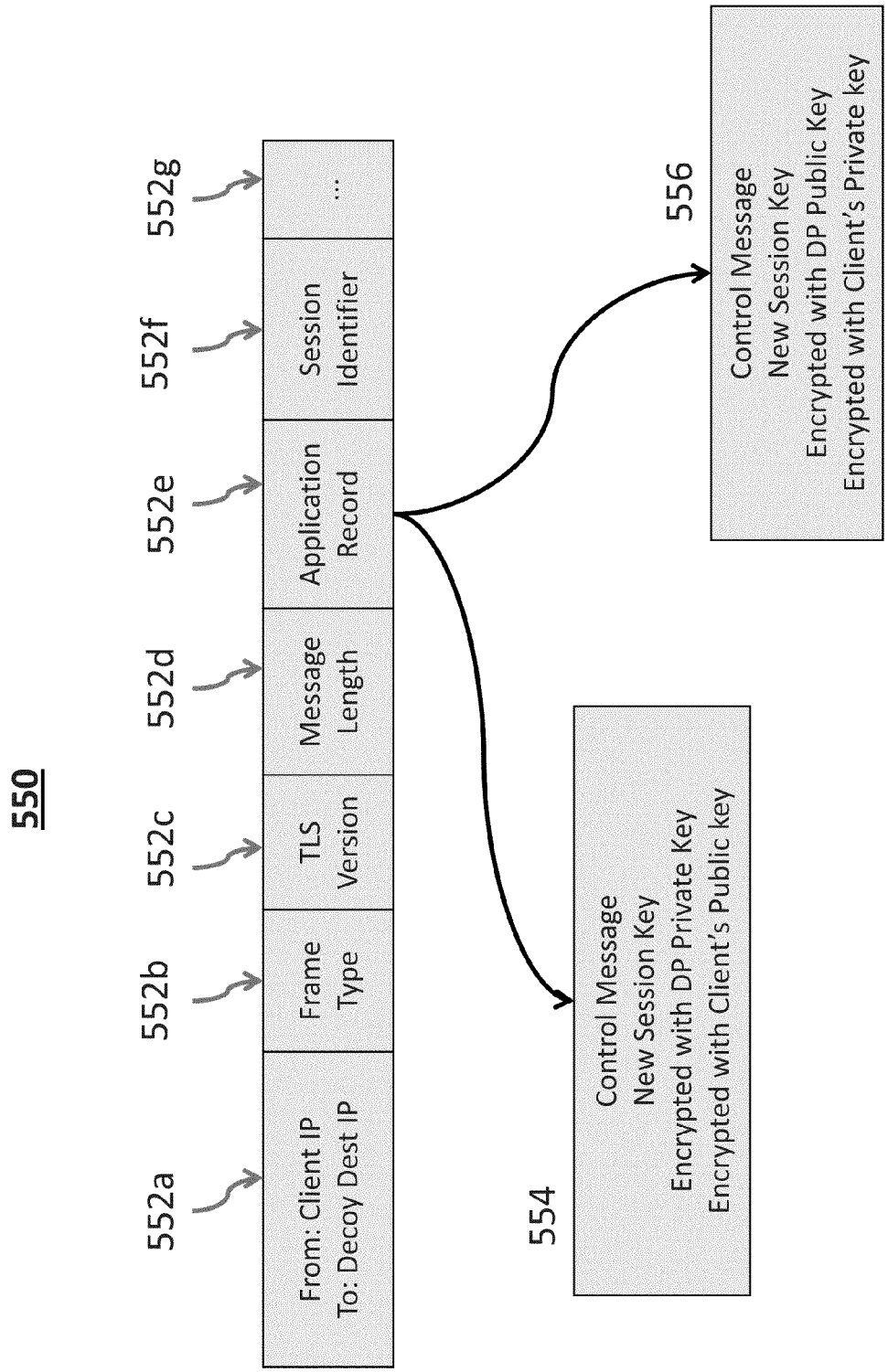
FIG. 5B is a second schematic of a transport layer socket IP packet for use in a decoy routing and/or covert channel bonding system, according to an illustrative embodiment of the invention.

FIG. 5B is a second schematic of an IP packet 550 for a TLS application protocol used by a decoy routing or covert channel bonding system illustrating exemplary TLS "Client" message 554 and "Decoy Proxy" message 556 that are transmitted via a TLS application protocol between a client computing device and a decoy proxy. The illustrative IP packet 550 in FIG. 5B does not include all the fields that would appear in a typical IP packet, nor does it include the fields in the order they may appear in an IP packet. Nevertheless, the illustration in FIG. 5B shows that IP packet 550 that is used in a TLS application protocol. IP packet 550 includes several fields of a TLS record after source and destination IP addresses 552a: a frame type 552b, a TLS version indication 552c, a TLS message length 552d, a TLS application record 552e, a session identifier 552f, and other information 552g. As with packet 500, the address 552a of packet 550 includes the IP address of the client computing device 562 and a decoy destination 568. The application record 552e may include a message 554 including a new communications session key. The message 554 may also include a control message. The message 554 is encrypted with the client computing device's public key and signed with the decoy proxy's private key, and optionally, may be encrypted with a suitable communications session key. In return, the client computing device transmits a packet to the decoy proxy with a message 556 including, e.g., a new TLS communications session key. The message 556 may also include a control message. The message 556 is encrypted with the client computing device's private key and signed with the decoy proxy's public key, and optionally includes additional encryption with a suitable communications session key. Once both messages 554 and 556 are transmitted and received, a secure TLS communications channel/connection is established between the client computing device and the decoy proxy. When used in the decoy routing process 400, these messages between the client computing device to the decoy router and/or decoy proxy may indicate, in a fashion that cannot be understood by a network component without the proper decryption key(s), the IP address of a covert destination for which the packet is intended.

Figure 5C:
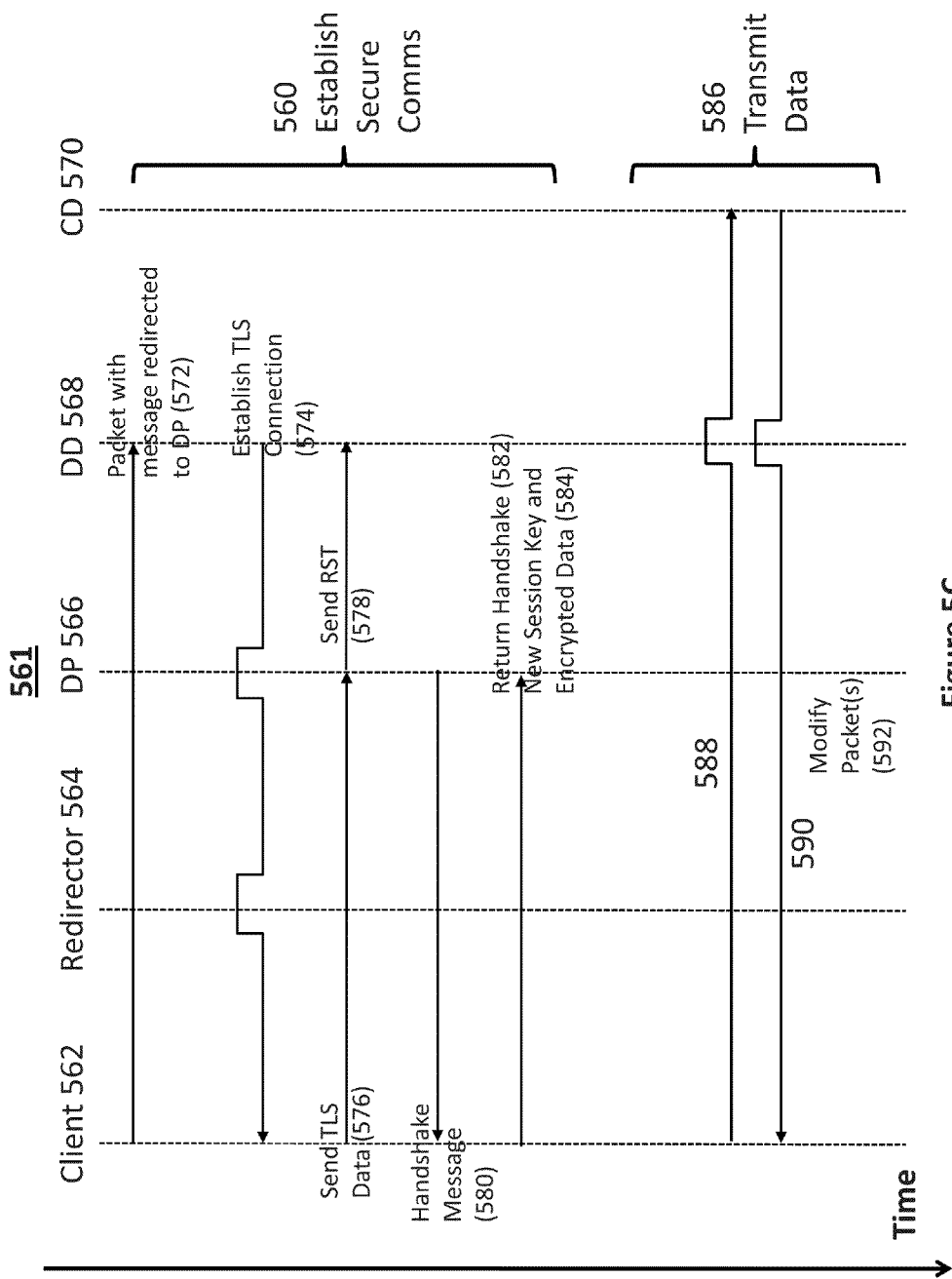
FIG. 5C is a timing diagram for establishing communications and transmitting packets between a client computing device, decoy router, decoy proxy, and covert destination using a transport layer socket, according to an illustrative embodiment of the invention.

FIG. 5C is a timing diagram 561 for establishing communications 560 and transmitting packets 586 via a TLS communications channel between a client computing device 562, a decoy router 564, a decoy proxy 566, a decoy destination 568, and a covert destination 570 using a TLS communication channel of a decoy routing or covert channel bonding system, such as system 200 of FIG. 2.

The decoy routing process will now be described with continued reference to FIGS. 4, 5A, 5B and 5C. The decoy routing process 500 begins when decoy router 564 receives a packet 500 from a client computing device 562 (step 402). The decoy router 564 determines if the packet 500 is intended for a covert destination on the network such as covert destination 570. In some embodiments, the packet is received after a TLS communications session has already been established between the client computing device 562 and the decoy destination 568. In some embodiments, this includes decoy router 564 examining the random number 502e of packet 500. As discussed above, the random number 502e may include information 504 including a control message from the client computing device, an encrypted session key or information encrypted with the session key for the TLS communication session. In some embodiments, if the packet is intended for a covert destination, the control message indicates the covert destination's IP address. In other embodiments, if the packet is intended for a covert destination, the control message indicates that the message must be forward to a decoy proxy, but does not include the covert destination's IP address. The decoy router 564 examines this random number and determines if the random number includes a control message that indicates that packet 500 should be re-routed towards a covert destination 570 (step 404). If decoy router 564 determines that the TLS packet is intended for a covert destination 570, decoy router 564 forwards the packet on to decoy proxy 566 (step 406). This decoy router process is indicated as line 572 in the timing diagram 561. If the packet is not intended for a covert destination 570, the packet is forwarded on to its destination (step 414) and the decoy router examines the control message within the next TLS packet it receives (step 402). As discussed above with respect to FIG. 2, preferably, the decoy router is configured to examine each and every packet passing through it for potential decoy routing. Thus, in one embodiment, as much of the functionality of the decoy router as possible is hardwired into an integrated circuit, such as an application specific integrated circuit (ASIC) so as not to introduce undue latency in the network. In addition, in certain embodiments, routers serving as decoy routers may include a plurality of decoy routers operating in parallel to further reduce latency. In some embodiments, a TLS communications session is first established between the client computing device and a decoy destination prior to the decoy router redirecting the traffic flow to a decoy proxy. In these embodiments, a RST message would have to be sent to the decoy destination prior to redirecting the traffic flow.

With continued reference to FIGS. 4 and 5A-5C, the decoy routing process 400 continues when a packet is redirected by the decoy router 574 to the decoy proxy 566 (step 408). The decoy proxy 566 and client computing device 562 establish and maintain a communications channel between one another, in a manner similar to that described with reference to FIG. 5B above. A TLS packet is sent from the client computing device 562 to the decoy destination 568. Upon receiving this packet from the decoy router 564, the decoy proxy 566 does not take any action to re-route packets of data to the covert destination 570 until this secure TLS communications channel is established. In some embodiments, decoy router 564 or decoy proxy 566 sends a reset (RST) message to the decoy destination 568. For instance, in situations in which certain packets form the client computing device 562 have already reached decoy destination 568, a RST message would be required to ensure that the decoy destination does not continued to send packets back to the client computing device 562. In other embodiments, the decoy router is not located at a network gateway, and thus sending a RST message of this type is required because other routers and/or proxy servers in the network may have routed packets from client computing device 562 to decoy destination 568. In still other embodiments, if there are multiple decoy routers in a network, sending a RST message of this type would be required because other routers and/or proxy servers in the network may have routed packets from client computing device 562 to decoy destination 568. For instance, in some embodiments, a TLS communications session is first established between the client computing device and a decoy destination prior to the decoy router redirecting the traffic flow to a decoy proxy. In these embodiments, a RST message would have to be sent to the decoy destination prior to redirecting the traffic flow. At this point in time, the perceived communications (e.g., as perceived by an adversary) between the client computing device 562 and the decoy destination 568 are actually communications occurring between client computing device 562 and decoy proxy 566. These steps are indicated as lines 574, 576 and 578 in timing diagram 561 of FIG. 5C.

Secure TLS communications are established between client computing device 562 and decoy proxy 566 using handshake messages. Decoy proxy 566 sends a packet 550 to client computing device 562. The packet 550 includes IP addresses 552*a*, a frame type 552*b*, a TLS version indication 552*c*, a TLS message length 552*d*, a random number 552*e*, a session identifier 552*f*, and other information 552*g*. As with packet 500, the address 552*a* of packet 550 includes the IP address of the client computing device 562 and the decoy destination 568. The random number 552*e* may include a handshake message 554 including a TLS "Clienthello" message and optionally, a new communications session key. The TLS handshake message 554 is encrypted with the client computing device's key, signed with the decoy proxy's private key, and may include additional encryption with a suitable communications session key. In return, client computing device 562 may acknowledge the message from the decoy proxy 566 by transmitting a TLS "Serverhello" message back to decoy proxy 566 which optionally includes a new communications session key. The TLS handshake message 556 is encrypted with the client computing device's 562 key and with the decoy proxy's 566 public key, and may include additional encryption with a suitable communications session key. Once both TLS handshake messages 554 and 556 are transmitted and received, a secure TLS communications channel or connection is established between client computing device 562 and decoy proxy 566. This handshake process is indicated as lines 580, 582, and 584 in the timing diagram 561 of FIG. 5C.

Once communications are established between client computing device 562 and decoy proxy 566, packets of data may be transmitted from client computing device 562 to covert destination 570 as indicated in lines 588 and 590 in timing diagram 561 of FIG. 5C (step 410). In order to transmit packets, decoy router 566 and/or decoy proxy 566 modify the packet (592 in timing diagram 561 of FIG. 5C) on packet 500 to replace the decoy destination IP address with the covert destination IP address, and the source IP address with the decoy proxy IP address, thus ensuring that the packet 500 includes the correct destination IP address so that it is properly communicated to covert destination 570. In this manner, a packet 500 intended for covert destination 570 that would have otherwise been blocked by an adversary in the same network as client computing device 562, is securely delivered. Similarly, for packets returning to the client computing device 562 from the covert destination 570, the covert destination 570 transmits a packet to the decoy proxy 566, which again modifies the packet, replacing the source IP address with the IP address of the decoy destination and the destination IP address with the IP address of the client computing device 562.

Figure 6:
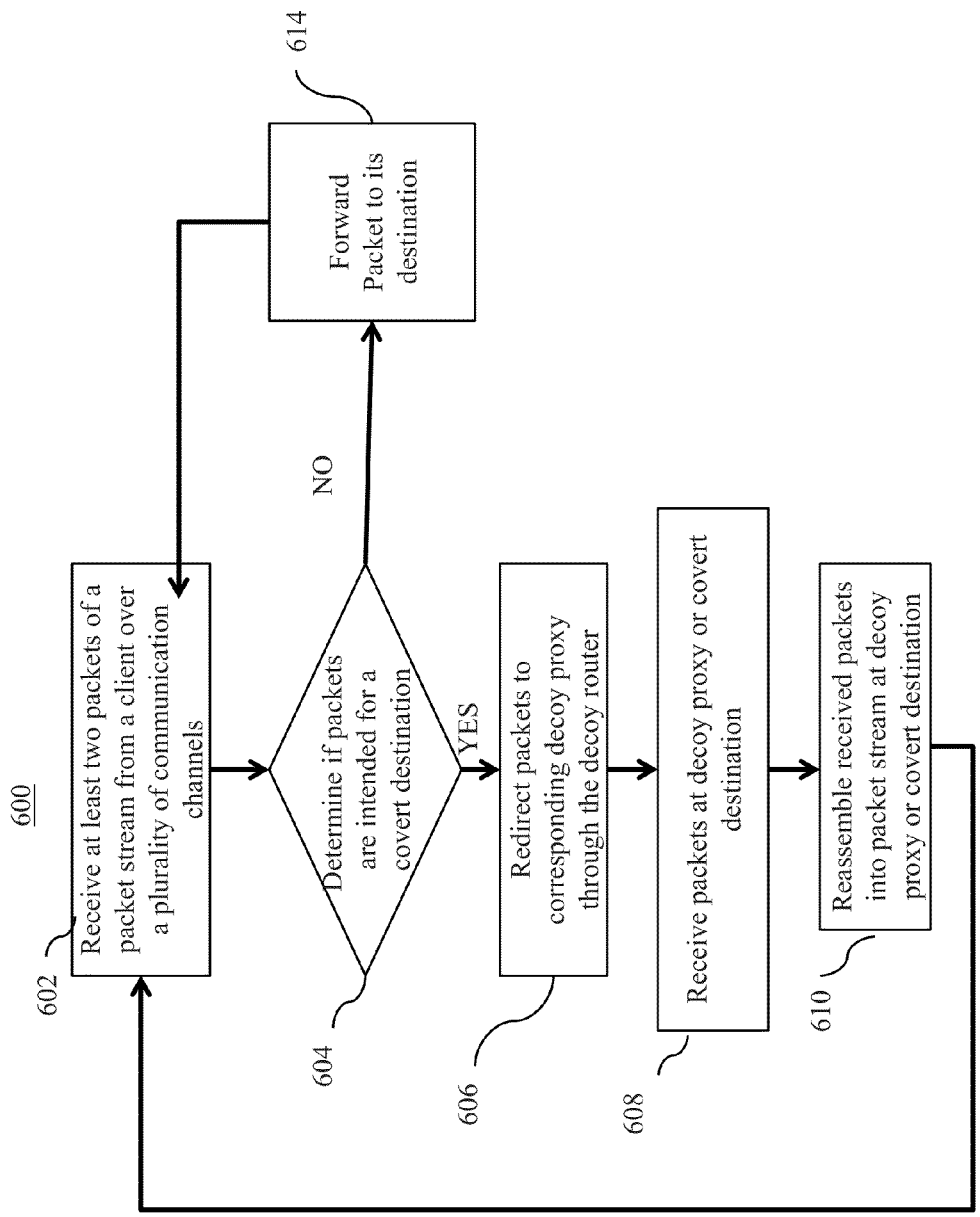
FIG. 6 is a process flow diagram for a covert channel bonding method that includes decoy routing, according to an illustrative embodiment of the invention.

FIG. 6 illustrates a process 600 for covert channel bonding that may be implemented using the systems 200, 300 and 350 described above with respect to FIGS. 2, 3A, and 3B. Covert channel bonding process 600 includes a decoy routing method such as process 400 of FIG. 4.

In a covert channel bonding process 600, multiple secure communications channels are established between a client computing device and one or more decoy proxies using the decoy routing process 400 of FIG. 4. At least two packets within a stream of packets of data are split by a client computing device and then transmitted from the client computing device via distinct communications channels to a decoy router, and subsequently to a set of these decoy proxies. This splitting is performed by a processor 352 (FIG. 3B) of the client computing device based on computer-readable instructions stored on memory 360 (FIG. 3B). The packets are subsequently delivered to a covert destination where they are reassembled into the stream of packets that was originally split by the client computing device. The secure communications channels may include one or more of TLS, VoIP, TCP-over-DNS, and web requests over HTTPS, etc. For each of these channels, it would be apparent to one of ordinary skill in the art that the packets 500 (FIG. 5A) and 550 (FIG. 5B) discussed with respect to TLS could be modified for covert channel bonding process 600 to use a variety of types of packets.

With continued reference to FIGS. 5A-5C and 6, covert channel bonding process 600 begins when decoy router 564 receives at least two packets of a stream of packets from a client computing device 562 (step 602). In some embodiments, there may be a plurality of decoy routers, each decoy router receiving a packet of the at least two packets. In some embodiments, the at least two packets are received after a TLS communications session has already been established between the client computing device 562 and the decoy destination 568. For each of the received packets, the decoy router 564 determines if a respective packet is intended for a covert destination 570 by examining the packet 500, as described above with respect to process 400 (FIG. 4), and if the packet is intended for a covert destination 570, the decoy router 564 forwards the packet 500 to one or more decoy proxies, e.g., decoy proxy 566 (step 606). This decoy router forwarding process is indicated as line 572 in the timing diagram 561 (FIG. 5C). If the packet is not intended for a covert destination 570, the packet is forwarded to its destination (step 614) and the decoy router examines the control message within the next packet it receives from client computing device 562 (step 602).

With continued reference to FIGS. 5A-5C and 6, the covert channel bonding process 600 continues when the received packets are redirected by the decoy router 564 to one or more decoy proxies such as decoy proxy 566 (step 606). Each decoy proxy then establishes and maintains a secure communication channel with client computing device 562, as discussed above with respect to decoy routing process 400 (FIG. 4). Once a secure communications channel is established between client computing device 562 and decoy proxy 566, one or more packets are transmitted from client computing device 562 and received by covert destination 570 (step 608). In some embodiments, packets are addressed to a set of decoy destinations and transmitted via the same communications channel (e.g., TLS) from a client computing device, through one or more decoy routers and/or one or more decoy proxies, to a single covert destination, where the packets are reassembled into the original stream of packets. In other embodiments, packets are transmitted via two different communications channels (e.g., TLS and VoIP) from one or more decoy routers to a set of decoy proxies and then on to a single covert destination, where the packets are reassembled into the original stream of packets. In still other embodiments, packets are transmitted from a client computing device, through one or more decoy routers and/or decoy proxies, to a single decoy proxy, where the packets are reassembled into the original stream of packets, and subsequently transmitted to a covert destination.

In order to transmit these packets such they do not get detected by an adversary in the same network as client computing device 562, decoy router 566 and/or one or more of the decoy proxies may modify the packet (592 in timing diagram 561) on packet 500 to replace the decoy destination IP address with the covert destination IP address thus ensuring that packet 500 includes the correct destination IP address so that it is delivered to covert destination 570. Subsequently, additional packets in the TCP/IP flow are transmitted in this manner to covert destination 570, and the received packets are reassembled into the stream of packets at covert destination 570 (step 610). Similarly, for packets returning to the client computing device 562 from the covert destination 570, the covert destination 570 transmits a packet to the decoy proxy 566, which again modifies the packet by replacing the source IP address with the IP address of the decoy destination and the destination IP address with the IP address of the client computing device 562.

The invention may be embodied in other specific forms without departing from the spirit or essential characteristics thereof. The forgoing embodiments are therefore to be considered in all respects illustrative, rather than limiting of the invention. For example, as suggested above, the system may be employed in situations where the goal is not to circumvent a sensor, but instead to provide additional privacy for sensitive communications.

What is claimed is:

1. A method for transmitting data from a client computing device in a restricted network to a covert destination using decoy routing, comprising:
   receiving, by a decoy router, a packet of data addressed to a decoy destination but intended for a covert destination;
   determining, by the decoy router, based at least in part on a message within the packet, that the packet is intended for a covert destination;
   directing, by the decoy router, the packet to a decoy proxy;
   establishing, by the decoy proxy, a communication channel with the client computing device over which communications between the decoy proxy and the client computing device appear to other devices on the network to be communications between the client computing device and the decoy destination;
   receiving, by the decoy proxy, a second packet of data from the client computing device addressed to the decoy destination;
   forwarding, by the decoy proxy, the second packet to the covert destination.

2. The method of claim 1, wherein the packet is an Internet Protocol (IP) packet.

3. The method of claim 1, wherein the packet is transmitted via one of voice-over-internet protocol (VoIP), Transport Layer Socket (TLS), Secure Socket Layer (SSL), secure hypertext transfer protocol (HTTPS), and transport communication protocol over domain name server (TCP-over-DNS) channel.

4. The method of claim 1, wherein establishing communications includes establishing a Transport Layer Security (TLS) channel between the client computing device and the decoy destination.

5. The method of claim 4, wherein establishing communications includes transmitting a sentinel between the decoy proxy and the client computing device.

6. The method of claim 1, wherein establishing communications further includes:
   providing an encryption key for the communications between the client computing device and the decoy proxy, and
   encrypting at least a portion of the first, second or any subsequent packet of data using the encryption key.

7. The method of claim 1, wherein the communication channel between the decoy proxy and the client computing device circumvents IP filtering carried out by an intervening network device.

8. The method of claim 1, further comprising:
modifying, by the decoy proxy, the packet, wherein modifying includes replacing a destination IP address of a packet with a new destination IP address.

9. A method for transmitting data via covert channel bonding, comprising:
receiving, by a plurality of decoy routers, at least two packets from a client computing device, wherein each of the at least two packets is addressed to a respective decoy destination but intended for a covert destination, the at least two packets are part of a stream of packets, and the at least two packets are transmitted over a first and a second communications channel;
determining, by the decoy routers, based at least in part on a message within each of the at least two packets, if the packets are intended for the covert destination; and
forwarding, by the decoy routers, the at least two packets to a decoy proxy.

10. The method of claim 9, further comprising:
establishing, by the decoy proxy, a first communications channel between the client computing device and the decoy proxy over which communications between the decoy proxy and the client computing device appear to other devices on the network to be communications between the client computing device and the decoy destination;
receiving, by the decoy proxy, a second packet of data from the client computing device addressed to the decoy destination;
forwarding, by the decoy proxy, the second packet to the covert destination.

11. The method of claim 9, further comprising:
receiving, at the decoy proxy, the at least two packets over the first and second communication channels; and
assembling, at the decoy proxy, the at least two packets to obtain the stream of packets.

12. The method of claims 11, wherein establishing communications includes sending a sentinel between the client computing device and a respective decoy proxy.

13. The method of claim 9, further comprising:
receiving, at the covert destination, the at least two packets over the first and the second communications channel; and
assembling, at the covert destination, the at least two packets to obtain the stream of packets.

14. The method of claim 9, wherein the first and second network communication channels are selected from a group comprising at least secure socket layer (SSL), transport layer security (TLS), secure hypertext transfer protocol (HTTPS), and voice-over-internet protocol (VoIP).

15. The method of claim 9, further comprising:
modifying, by the decoy proxy, the at least two packets, wherein modifying includes replacing a respective destination IP address of a respective packet with a respective new destination IP address.

16. A system for transmitting data from a client computing device to a covert destination, comprising:
a decoy router for
receiving a packet of data addressed to a decoy destination but intended for a covert destination;
determining, based at least in part on a message within the packet, that the packet is intended for the covert destination instead of the decoy destination; and
forwarding the packet to a decoy proxy.

17. The system of claim 16, further comprising:
a decoy proxy for
receiving the packet of data;
establishing a communication channel with a client computing device that transmitted the packet over which communications appear to other devices on the network to be communications between the client computing device and the decoy destination instead of the client computing device and the covert destination;
receiving one or more additional packets of data, addressed to the decoy destination but intended for the covert destination, from the client computing device; and
forwarding the one or more additional packets to the covert destination.

18. The system of claim 17, wherein the communications channel is selected from a group comprising at least secure socket layer (SSL), transport layer security (TLS), secure hypertext transfer protocol (HTTPS), and voice-over-internet protocol (VoIP).

19. The system of claim 16, wherein the decoy router is coupled to a network gateway for a network including the covert destination.

20. A non-transitory computer readable medium for decoy routing including computer-readable instructions, which when executed by a processor, cause the processor to:
generate a packet of data addressed to a decoy destination that includes a message indicating the packet of data is intended for a covert destination; and
transmit the packet from a client computing device to the decoy destination.

21. The non-transitory computer readable medium of claim 20, further comprising computer-readable instructions, which when executed by a processor, cause the processor to:
establish a communication channel with a decoy proxy over which communications appear to other devices on the network to be communications between the client computing device and the decoy destination instead of the client computing device and the covert destination.

22. The non-transitory computer-readable medium of claim 20, wherein the communications channel is a secure communications channel.

23. The non-transitory computer-readable medium of claim 20, wherein the secure communications channel is selected from a group comprising at least secure socket layer (SSL), transport layer security (TLS), secure hypertext transfer protocol (HTTPS), and voice-over-internet protocol (VoIP).

24. A non-transitory computer readable medium for decoy routing including computer-readable instructions, which when executed by a processor, cause the processor to:
receive a packet of data addressed to a decoy destination but intended for a covert destination;
establish a communication channel with a client computing device that transmitted the packet over which communications appear to other devices on the network to be communications between the client computing device and the decoy destination instead of the client computing device and the covert destination;
receive one or more additional packets of data, addressed to the decoy destination but intended for the covert destination, from the client computing device; and
forward the one or more additional packets to the covert destination.

25. The computer-readable medium of claim 24, wherein the communications channel is a secure communications channel.

26. The computer-readable medium of claim 24, wherein the secure communications channel is selected from a group comprising at least secure socket layer (SSL), transport layer security (TLS), secure hypertext transfer protocol (HTTPS), and voice-over-internet protocol (VoIP).

27. A non-transitory computer readable medium for decoy routing including computer-readable instructions, which when executed by a processor, cause the processor to:
   receive a packet of data addressed to a decoy destination but intended for a covert destination;
   determine, based at least in part on a message within the packet, that the packet is intended for the covert destination instead of the decoy destination;
   forward the packet to a decoy proxy.

28. The computer-readable medium of claim 27, wherein the packet is transmitted via a secure communications channel.

29. The computer-readable medium of claim 27, wherein the secure communications channel is selected from a group comprising at least secure socket layer (SSL), transport layer security (TLS), secure hypertext transfer protocol (HTTPS), and voice-over-internet protocol (VoIP).

* * * * *